US011986966B2

(12) United States Patent
Buerger et al.

(10) Patent No.: US 11,986,966 B2
(45) Date of Patent: May 21, 2024

(54) METHOD FOR OPERATING A ROBOT IN A MULTI-AGENT SYSTEM, ROBOT, AND MULTI-AGENT SYSTEM

(71) Applicant: Robert Bosch GmbH, Stuttgart (DE)

(72) Inventors: Mathias Buerger, Stuttgart (DE); Philipp Christian Schillinger, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 443 days.

(21) Appl. No.: 17/419,918

(22) PCT Filed: Mar. 3, 2020

(86) PCT No.: PCT/EP2020/055567
§ 371 (c)(1),
(2) Date: Jun. 30, 2021

(87) PCT Pub. No.: WO2020/182541
PCT Pub. Date: Sep. 17, 2020

(65) Prior Publication Data
US 2022/0055217 A1     Feb. 24, 2022

(30) Foreign Application Priority Data
Mar. 8, 2019 (DE) .......................... 102019203214.1

(51) Int. Cl.
*B25J 9/16* (2006.01)
*G05B 19/418* (2006.01)

(52) U.S. Cl.
CPC ............. *B25J 9/1682* (2013.01); *B25J 9/163* (2013.01); *G05B 19/41815* (2013.01); *G05B 2219/32328* (2013.01)

(58) Field of Classification Search
CPC ... B25J 9/1682; B25J 9/163; G05B 19/41815; G05B 2219/32328; Y02P 90/02
See application file for complete search history.

(56) References Cited

U.S. PATENT DOCUMENTS 6,169,981 B1 * 1/2001 Werbos .............. G05B 13/0285
706/26
2001/0042123 A1 * 11/2001 Moody .................... G06F 9/50
709/205
(Continued)

FOREIGN PATENT DOCUMENTS

DE    102008037576 A1    6/2010
DE    102011076356 A1    11/2012
(Continued)

OTHER PUBLICATIONS

Koenigetal,ThePowerofSequentialSingle-ItemAuctionsforAgentCoordination,AAAI,ProceedingsoftheNationalConferenceonArtificialIntelligence-AAAI2006,Jan. 1, 2006,(Jan. 1, 2006),pp. 1625-1629,XP055574443(Year:2006) (Year: 2006).*
(Continued)

*Primary Examiner* — Abby Y Lin
*Assistant Examiner* — Dylan M Katz
(74) *Attorney, Agent, or Firm* — NORTON ROSE FULBRIGHT US LLP; Gerard A. Messina (57) ABSTRACT

A method for operating a multi-agent system including multiple robots. Each robot cyclically carries out the following: starting from an instantaneous system state, ascertaining possible options, the options defining actions via which a transition from an instantaneous system state to a subsequent system state may be achieved; for each possible option, ascertaining action costs for carrying out an action indicated by the option; carrying out an auction, the action cost values ascertained for each option being taken into account by each of the other robots; and executing an action that corresponds to one of the options as a function of all cost values ascertained or received for the option in question, the action costs for an option taking into account an empirical parameter that is a function of costs for past actions, which have already been carried out and which are associated with the option, of the multiple robots.

8 Claims, 4 Drawing Sheets

(56) References Cited

U.S. PATENT DOCUMENTS

2018/0082213 A1* 3/2018 McCord ............... G06N 7/01
2019/0030719 A1* 1/2019 Dey .................. B25J 9/1682
2020/0082728 A1* 3/2020 Buchanan ............ G06Q 30/08

FOREIGN PATENT DOCUMENTS

| DE | 112012003253 T5 | 4/2014 |
| --- | --- | --- |
| DE | 102015002367 A1 | 9/2015 |
| DE | 102017106321 A1 | 10/2017 |
| DE | 102017223717 A1 | 6/2019 |
| DE | 102018207539 A1 | 11/2019 |
| EP | 3605334 A1 | 2/2020 |

OTHER PUBLICATIONS

International Search Report for PCT/EP2020/055567, dated Jun. 23, 2020.

Schillinger et al., "Auctioning Over Probabilistic Options for Temporal Logic-Based Multi-Robot Cooperation Under Uncertainty," IEEE International Conference on Robotics and Automation, 2018, pp. 1-8. <https://people.kth.se/~dimos/pdfs/ICRA18_Auctions.pdf> Downloaded Jun. 28, 2021.

Schillinger et al. "Improving Multi-Robot Behavior Using Learning-Based Receding Horizon Task Allocation," Robotics: Science and Systems (RSS), 2018, pp. 1-10. <http://www.roboticsproceedings.org/rss14/p31.pdf> Downloaded Jun. 28, 2021.

\* cited by examiner

METHOD FOR OPERATING A ROBOT IN A MULTI-AGENT SYSTEM, ROBOT, AND MULTI-AGENT SYSTEM

FIELD

The present invention relates to multi-agent systems, and in particular a method for controlling robots of a multi-agent system by distributing tasks with the aid of a cooperative auction process.

BACKGROUND INFORMATION

Coordinating a team of robots for jointly handling a task is difficult, in particular when there are uncertainties in the conditions of the surroundings, and temporal dependencies in the task specification. Breaking down the task specification into subtasks requires suitable mechanisms, it being possible in particular that the activity instructions for the individual robots are not satisfactorily associated due to the uncertainties of the actual surroundings.

For mapping temporal dependencies between individual activities of robots, a description language, so-called linear temporal logic (LTL), is used which maps a task specification in the form of an LTL specification. Action plans, i.e., a set of activity instructions for the individual robots, may be derived from the LTL specification in a conventional manner.

LTL for robot applications allows temporal boundary conditions to be integrated into probabilistic models, in particular using Markov decision processes (MDP). Markov decision processes may be used to map uncertainties, including unknown time periods, of the execution of actions and stochastic events in the surroundings.

To create activity instructions under uncertainty for LTL task specifications, a plan for an individual robot may be provided which combines an automaton representation of the task specification with a Markov decision process. In addition, activity instructions for individual robots may be planned in order to maximize a use of an LTL task description.

In general, auction processes for coordinating multiple robots independently of a specific model are described, for example, in P. Schillinger et al., "Auctioning over Probabilistic Options for Temporal Logic-Based Multi-Robot Cooperation under Uncertainty," IEEE International Conference on Robotics and Automation, 2018, which provides a method for coordinating a team of robots for fulfilling a shared task. Temporal dependencies and uncertainties of the surroundings may be taken into account. The described method allows uncertainties and observations to be taken into account during the task execution by carrying out a task distribution with the aid of an auction process.

Efficient planning algorithms for coordinating robots of a multi-agent system in nondeterministic surroundings for solving tasks with temporally dependent specifications are presently not known.

SUMMARY

According to the present invention, a method for operating a robot in a multi-agent system and a robot and a multi-agent system are provided.

Further embodiments are disclosed herein.

According to a first aspect of the present invention, a method for operating a multi-agent system including multiple robots is provided, in which a predefined mission that is defined by a sequence of system states is to be executed. In accordance with an example embodiment of the present invention, each of the robots cyclically carrying out the following method:

carrying out one or multiple auction rounds, the following steps being carried out in each auction round:
  starting from a considered system state, ascertaining possible options, the options defining actions via which a transition from a considered state to a successor state may be achieved;
  for each of the possible options, ascertaining action costs for carrying out an action that is indicated by the option;
  providing to the other robots the ascertained action costs for each of the options, and receiving from the other robots the action costs for each of the options;
  carrying out an auction, so that an option is associated as a function of action costs associated with the option in question;
executing the actions, which are indicated by the associated options and which correspond to one or multiple of the options, as a function of all action costs that are ascertained or received concerning the options in question, for a considered option, the action costs taking into account estimated mission costs, the mission costs being ascertained based on the costs for achieving a present system state, on empirical costs that indicate estimated costs for achieving a target state of the mission, starting from a successor state that is achievable via the option, and on the costs for carrying out the considered option.

In accordance with the above example method for operating a multi-agent system including multiple robots (agents), a deterministic finite automaton is provided that defines the task specification to be solved by a multi-agent system. The deterministic finite automaton includes multiple system states that define one or multiple state paths that must be passed through to achieve the task objective. In this deterministic finite automaton, the actions that result in achieving state transitions are associated with various robots in an auction process. The state transitions between the system transitions along one of the state paths, executable by a robot, are referred to below as options.

In the process of associating with individual robots the state transitions to be executed, subtasks that result in state changes may be associated with the individual robots as options. Such an auction process, with the aid of a suitable cost function, for the overall mission costs allows a subtask to be associated with those robots that may carry out the subtask in question at the lowest cost. A cost function may take into account in particular the time expenditure for carrying out the subtask in question, as well as the probability that with the carrying out of the subtask, the condition that is defining for the system state, but also other criteria such as energy consumption and/or the like, is/are met.

If a system state condition for a system state is met by executing an option, the execution of all ongoing options in the other robots is interrupted, and new auction rounds are carried out in which new options are now distributed to the robots of the multi-agent system. The new options are determined in one or multiple auction rounds, corresponding to the relevant state transitions originating from the system state now achieved. This method is carried out until the target state is achieved. A distribution of options in a multi-agent system may thus be efficiently carried out, it being possible in particular to take temporal dependencies into account in a particularly efficient manner.

By specifying the deterministic finite automaton to all robots, each of the robots may ascertain its options with regard to the higher-order task objective in a distributed manner, it being necessary to solve a probabilistic planning problem that is much less complex. Due to the decentralized auction scheme, the various options are associated with various robots, the provided auction algorithm allowing the robots to carry out options that are temporally dependent on other options. With each fulfillment of a state condition (by achieving the successor state by executing an appropriate option), the method is carried out again, so that the knowledge about system states may be taken into account in an up-to-date manner.

The above method allows a multi-agent system to be efficiently coordinated, in particular when there are uncertainties of the surroundings conditions. This applies in particular for specifications that contain the temporal logic system that is to be processed by the entire team of robots. For this purpose, subtasks of the task specification are automatically associated with the robots. In addition, the conditions of the system environment may be taken into account by regularly updating the planned activity instructions, so that the robots may be flexibly adapted to the uncertainties.

In addition, an option may be associated when, for the option in question, action costs are ascertained that indicate the lowest costs of all action costs that are received for the option in question.

According to one specific embodiment of the present invention, auction rounds may be carried out until at least one option is associated with all robots. Alternatively, an upper limit for a maximum number of auction rounds may be established, or the auction rounds may be carried out for a limited time.

It may be provided that the action costs are determined as a function of a probability that the mission utilizes the considered option.

According to one specific embodiment of the present invention, for the second and further auction rounds the considered system states for ascertaining the options may correspond to the successor states of the options considered in the preceding auction round.

It may be provided that the empirical costs are updated by one of the robots upon achieving a successor state when executing an action associated with one of the options, by ascertaining the costs for executing the action by the robot in question and adapting the empirical parameters as a function of the ascertained costs and in particular as a function of an adaptation parameter.

Furthermore, the action costs for an option may be indicated as a function of a time period or as a time period for executing the action associated with the option.

It may be provided that the action costs for an option are ascertained as a function of a state probability that a state condition for achieving the successor state, when executing the action associated with the option, results from the option.

According to one specific embodiment of the present invention, a state probability that a state condition for achieving the system state is achieved when executing an action that is associated with an option may be updated during the execution of the action.

According to a further aspect of the present invention, a robot for operating a multi-agent system is provided, in which a predefined mission that is defined by a sequence of system states is to be carried out. In accordance with an example embodiment of the present invention, the robot is designed to cyclically execute the following steps:

carrying out one or multiple auction rounds, the following steps being carried out in each auction round:
starting from a considered system state, ascertaining possible options, the options defining actions via which a transition from a considered state to a successor state may be achieved;
for each of the possible options, ascertaining action costs for carrying out an action that is indicated by the option;
providing to the other robots the ascertained action costs for each of the options, and receiving from the other robots the action costs for each of the options;
carrying out an auction, so that an option is associated as a function of action costs associated with the option in question;
executing the actions, which are indicated by the associated options and which correspond to one or multiple of the options, as a function of all action costs that are ascertained or received concerning the options in question, for a considered option, the action costs taking into account estimated mission costs, the mission costs being ascertained based on the costs for achieving a present system state, on empirical costs that indicate estimated costs for achieving a target state of the mission, starting from a successor state that is achievable via the option, and on the costs for carrying out the considered option.

According to a further aspect, a multi-agent system including multiple of the above robots is provided.

BRIEF DESCRIPTION OF THE DRAWINGS

Specific embodiments are explained in greater detail below with reference to the figures.

DETAILED DESCRIPTION OF EXAMPLE EMBODIMENTS

Figure 1:
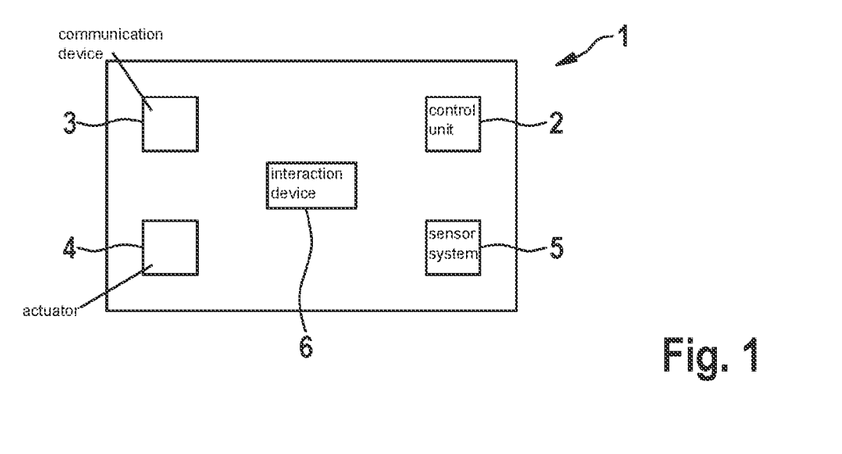
FIG. 1 shows a schematic illustration of a robot of a multi-agent system, in accordance with an example embodiment of the present invention.

A method in accordance with the present invention in which agents, as robots that interact with the environment, are provided in a multi-agent system is described below. Robots 1 have a configuration as schematically illustrated in FIG. 1. For this purpose, robots 1 in each case include a control unit 2 that is designed to execute subtasks. For communication with other robots 1, each of robots 1 also includes a communication device 3 in order to transfer information to other robots 1 and receive information from same.

Robot 1 may interact with the system environment with the aid of an actuator 4. Actuator 4 may encompass, for example, a movement actuator, a grip actuator, and the like that are operated in a manner known per se corresponding to the subtask assigned to robot 1. Robot 1 may thus in particular move, pick up and set down objects, and the like.

In addition, surroundings states may be detected with the aid of a sensor system 5. Sensor system 5 may encompass, for example, a camera and other sensor systems that are usable for object detection, such as an ultrasonic sensor system and the like. With the aid of the camera, positions of objects that may/are to be interacted with may be detected and identified, and movement within the system environment is made possible in which objects representing obstacles are bypassed.

Robots 1 may also be provided with an interaction device 6, such as a touch display or a speech input/output device, in order to communicatively interact with objects or persons in the surroundings. In this way, persons may make inputs at robots 1 and receive information.

The starting point of the method described below is a task specification in the form of a linear temporal logic (LTL), in particular a co-safe linear temporal logic (scLTL). This represents a description language for a task specification of a task to be solved which has temporal modalities. Each scLTL task specification may be translated into a deterministic finite automaton (DFA).

Figure 2:
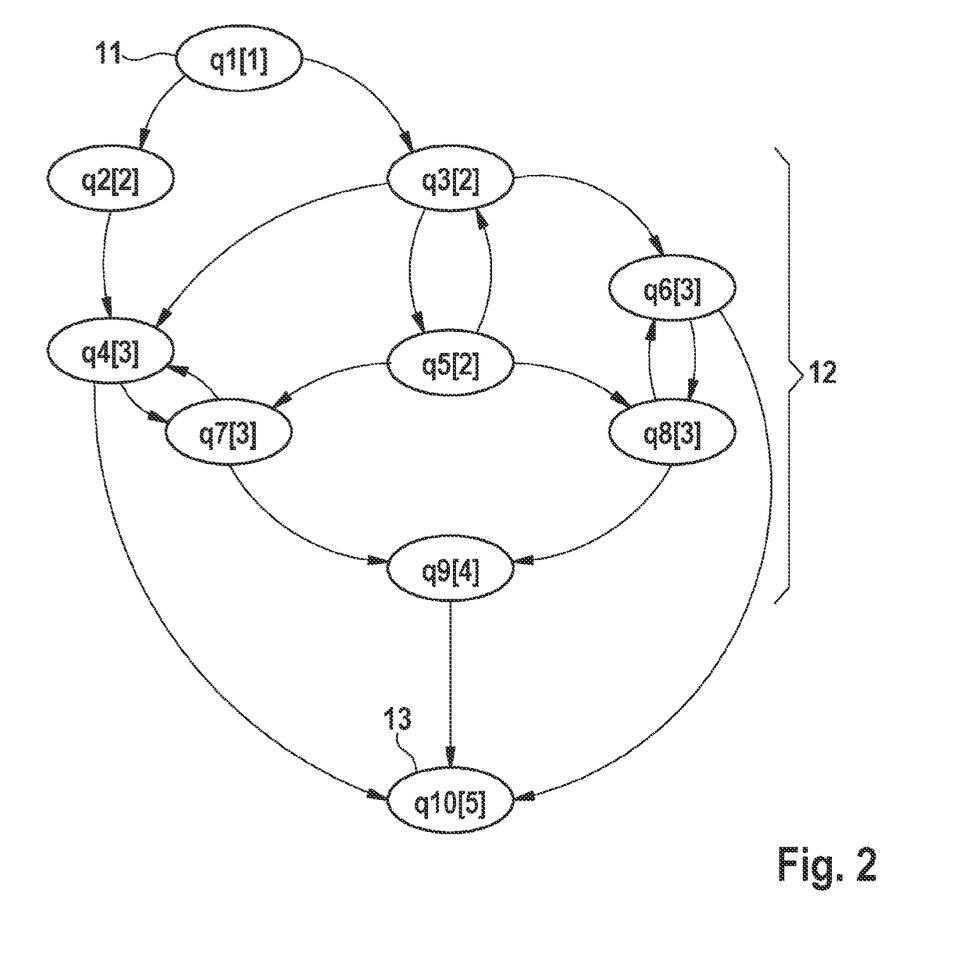
FIG. 2 shows an illustration of a deterministic finite automaton, in accordance with an example embodiment of the present invention.

Such a deterministic finite automaton (DFA) is illustrated by way of example in FIG. 2. System states (advancement states) (q1-q10) which contain an initial state 11 ($q1$), multiple intermediate states 12 ($q2$-$q9$), and one or multiple target states 13 ($q10$) are shown. The mission of the multi-agent system is completed when a target state is achieved. In the illustration for depicting the deterministic finite automaton, arrows show state transitions from initial state 11 ($q1$) to target state 13 ($q10$) along one or multiple paths. A system state is achieved when a state condition associated with the system state in question is met. The system states from initial state 11 to target state 13 are achieved via advancement along the path. Advancement along one of the paths is achieved when there is no option for a return path from one system state to a subsequent system state. The advancement along the paths is indicated by advancement levels, in particular ascending advancement levels.

Figure 3:
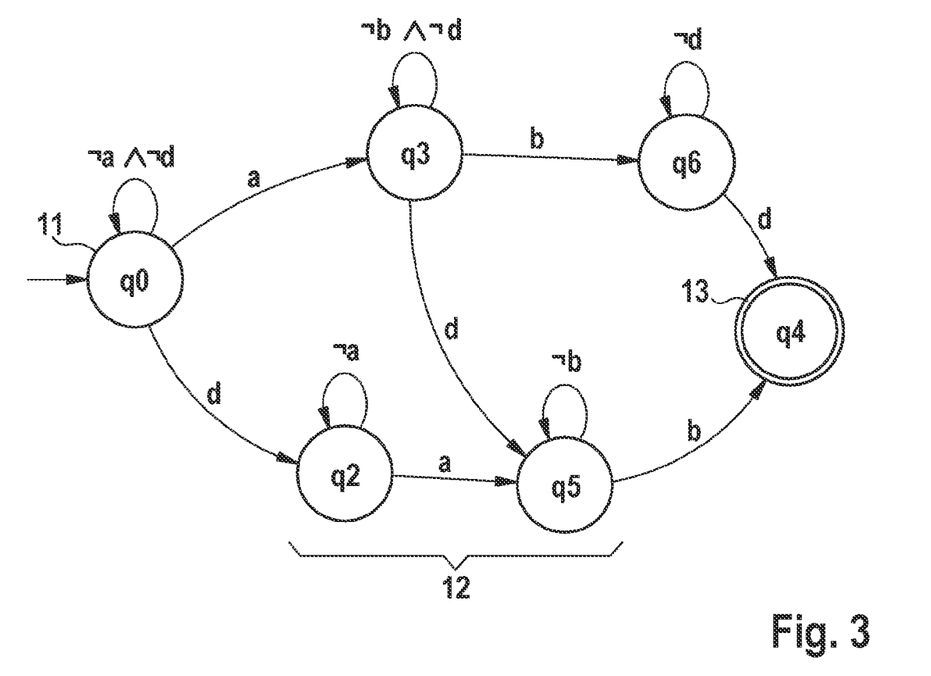
FIG. 3 shows an illustration of a cyclical finite automaton, in accordance with an example embodiment of the present invention.

FIG. 3 shows a schematic illustration of a cyclical finite automaton including system states q0-q4, which is suitable for describing repeating cyclical tasks. The cyclical finite automaton may be part of a finite automaton or may represent same. A cyclical finite automaton is characterized, for example, in that when target state (q4) 13 has been achieved, it is reset to an earlier state, for example starting state (q0) 11. Unless indicated otherwise below, the terms "deterministic finite automaton" and "cyclical finite automaton" may be understood to be equivalent for the described method. The illustrated cyclical finite automaton corresponds to the following LTL formula:

$$\varphi = \Diamond(a \wedge \Diamond b) \wedge \Diamond d$$

Control unit 2 is designed to recognize, by evaluating sensor system 5 and/or by evaluating inputs in interaction device 6, whether a system state predefined by a task specification has been achieved.

A method for associating options with individual robots 1 in a cyclical finite automaton is described below. The association of options in a noncyclical portion of the deterministic finite automaton may be carried out according to the same or a different method.

An option is understood herein to mean a possible action of a robot that effectuates a transition from a present system state q to a successor state q' of the automaton. If the automaton or the system is in a system state q that is not the target state, one or multiple successor states q' are possible. In contrast to the system states that indicate the advancement during management of the mission that is predefined by the automaton (determined by the task specification), the physical states of the individual robots are determined by their instantaneous robot state, such as their own position.

A prerequisite for the method for operating the multi-agent system is that each robot 1 is capable of communicating with each of the other robots 1, and that cyclical finite automaton DFA is made known to each robot 1. The following method, illustrated in conjunction with FIG. 4, describes the sequence in one of robots 1 at an arbitrary point in time that corresponds to an initial state, or a point in time after achieving a further system state that is not the target state, the method being carried out basically in parallel in each of robots 1.

Figure 4:
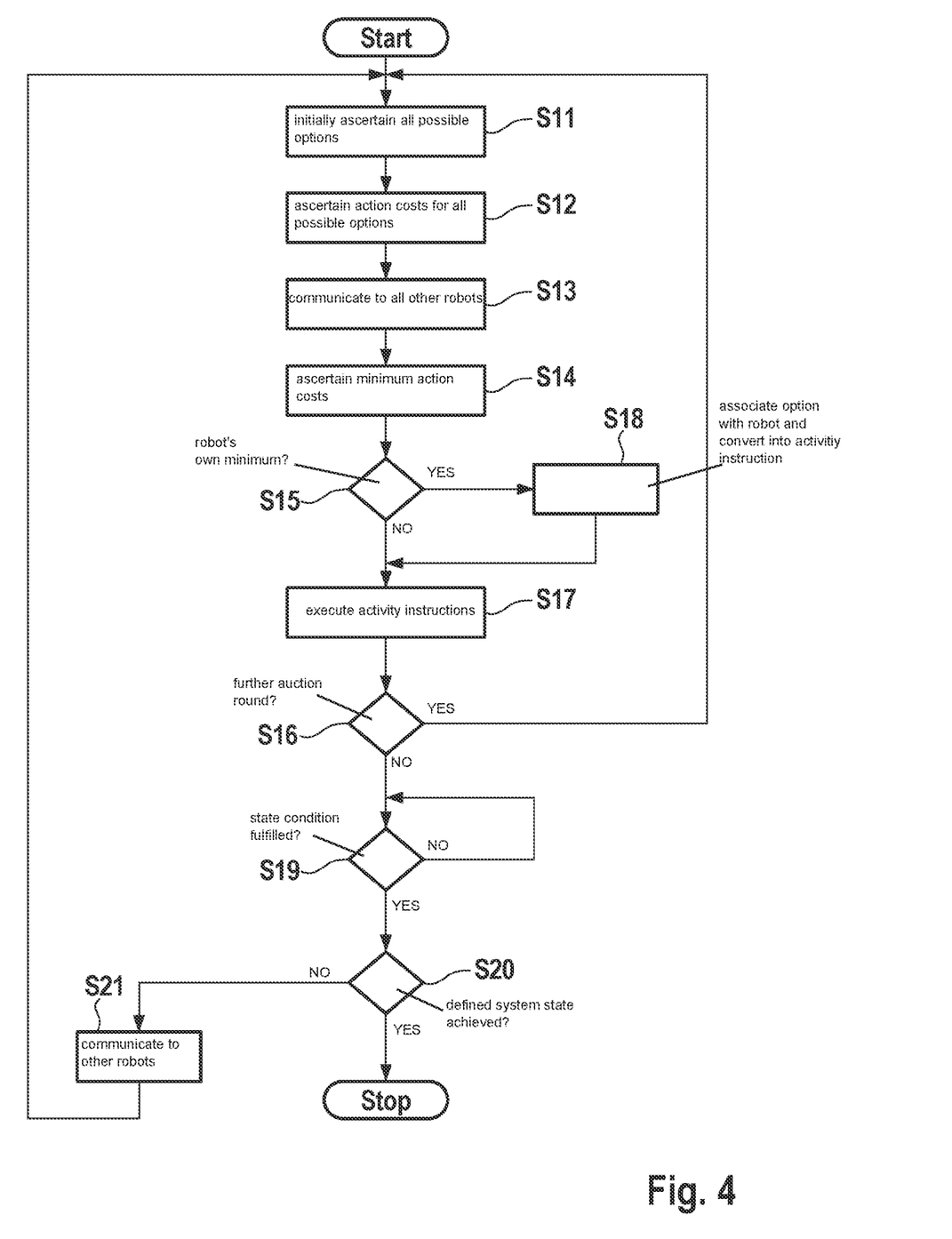
FIG. 4 shows a flowchart for illustrating a method for operating the multi-agent system in order to solve a task specification for given tasks, in accordance with an example embodiment of the present invention.

All possible options are initially ascertained in step S11, starting from instantaneous system state q in the deterministic finite automaton, in particular during the first pass starting from initial state 11. The options (illustrated as state transitions from a set (present) system state q to a possible successor state q') represent possibilities for achieving a next possible system state of the deterministic finite automaton.

Action costs AK are now ascertained in step S12 for all of the possible options ascertained in step S11. Action costs AK may be a function, for example, of a time period for executing the mission for robot 1 in question. In addition, action costs AK may take probabilities into account for a system environment that has uncertainties.

The determination of action costs AK with regard to an option is described in greater detail below.

The costs thus ascertained in step S13, for each of the possible options of robot 1 in question, are now communicated to all other robots 1. Thus, information concerning the costs for each of the options is present in all robots 1.

Minimum action costs AK are now ascertained in step S14 for each possible system state that is achievable via options that are ascertained by one of the robots itself or obtained from other robots 1.

It is subsequently checked in each robot 1 in step S15 as to whether the robot's own costs represent the minimum costs over all provided action costs AK for an intermediate state that is achievable via an option. If this is the case (alternative: yes), the option in question (with the lowest costs) is thus associated with robot 1 in question (which has established this) in step S18, and is converted into an activity instruction for achieving the system state indicated by the option. This process takes place in each robot in parallel, so that each robot 1 knows the associations of the other robots 1. The method is subsequently continued with step S16. If it is established in step S15 that for the intermediate state that is achievable via an option, the robot's own action costs do not represent the minimum costs over all provided action costs AK (alternative: no), the method is directly continued with step S16.

It is now checked in step S16 as to whether a further auction round (index k) is carried out. A further auction round takes into account every possible achievable successor state (successor system state) of options, assigned in the preceding auction round, as a possible starting state (starting system state), i.e., the successor states that are achievable via the previously evaluated options, and ascertains further options to be evaluated together with their corresponding successor states.

Figure 5:
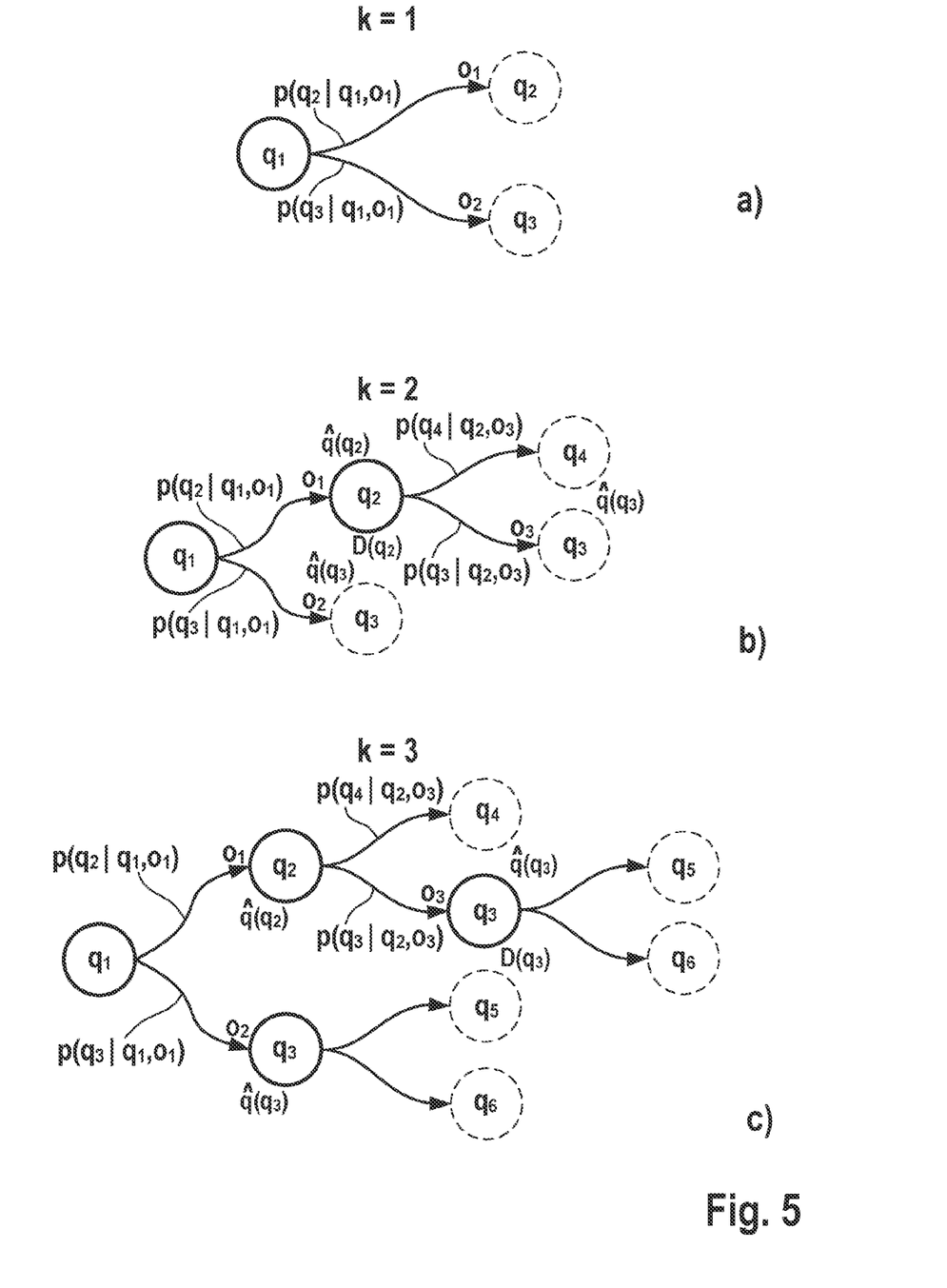
FIGS. 5a through 5c show illustrations of examples of the options for multiple successive auction rounds.

This is depicted by the schematically illustrated auction rounds in FIG. 5. If it is established in step S16 that not all robots 1 have yet been assigned at least one option and/or that none of the successor states correspond to the target state (alternative: yes), a further auction round is carried out and the method is continued with step S11. Otherwise (alternative: no), the method is continued with step S17.

Accordingly, the execution of the activity instructions defined by the associated options is immediately started in step S17.

A check is made in each robot 1 in step S19 as to whether the state condition has been fulfilled by the robot's own action, or whether a corresponding piece of information concerning fulfillment of a state condition has been received from another of robots 1. The fulfillment of the state condition corresponds to the complete execution of an option that has resulted in achieving a successor state q'. If this is not the case (alternative: no), the method returns to step S19, and either the robot's own option is continued or the fulfillment of the state condition is awaited by another of robots 1; otherwise (alternative: yes), the method skips to step S20.

It is checked in step S20 whether a defined target system state, which defines an abortion condition, for example, has been achieved. If this is the case (alternative: yes), the method is terminated. Otherwise (alternative: no), the fulfillment of the state condition or the complete execution of an option is communicated to the other robots 1 in step S21 and the method returns to step S11.

If it is established in step S15 for each of the options that none of the options can be executed with the minimum costs (alternative: no), the method is continued with step S17.

If the minimum costs are the same, the option in question may possibly be simultaneously associated with multiple robots 1, so that they simultaneously carry out the activity instructions corresponding in each case to the option. Alternatively, the option in question may be associated with only a single, randomly selected robot 1 with the minimum costs. Due to the association process including the multiple auction rounds, one or multiple options are generally associated with each robot 1.

Each robot 1 cyclically carries out the method during the task execution, taking into account shared system state q of the cyclical finite automaton as well as the robot's own state s. Starting from these states, each of the robots 1 carries out the above-described method in order to obtain an assignment of one or multiple options.

Each robot 1 then executes the options associated with it in the order of assignment by following the corresponding activity instructions. When one of robots 1 achieves a successor state, an interrupt signal is transmitted to all other robots 1 in order to abort their action at that moment. At the same time, the achieved system state is communicated to the other robots 1 and a new auction process is started. In particular, when the cyclical finite automaton is used, the system state is set to initial state 11 whenever a target state 13 is achieved.

Action costs AK, with which each robot 1 deals in the auction, are ascertained as described below.

Action costs AK, ascertained by each robot 1 for the auction, correspond to the total costs until the mission is terminated, i.e., until the task is fulfilled or the target state is achieved, under the assumption that robot 1 presently in question executes the action of the option presently under consideration. Overall, multiple auctions are carried out for each of the successive options, which represent a path to a target state.

FIG. 5 correspondingly shows the advancement along the system states of the deterministic finite automaton for the iteratively occurring action cost computations in each auction round. Action costs AK for the first auction round may thus be computed by:

$$AK = d_0(\hat{s}^r) + \sum_{q'} p(q' \mid q, o) V(q'),$$

where q corresponds to the initial system state for the first auction round and q' corresponds to those system states which likely result from the execution of option o. A more general form of action costs AK for all auction rounds results from:

$$AK = \hat{q}(q)\left[\max\{D(q), d\} + d_0(\hat{s}) + \sum_{q'} p(q' \mid q, o) V(q')\right] + \sum_{\tilde{q} \neq q} \hat{q}(\tilde{q})(D(\tilde{q}) + V(\tilde{q}))$$

All costs may be expressed as time information until the successor state or a target system state is achieved. Of course, costs may also take other resource consumers into account. The first term in brackets corresponds to the expected execution costs until a particular successor state q' is achieved, when option o is selected. The first term is computed as the sum of:
- the maximum of costs D(q), i.e., the costs for achieving system state q of the particular considered option, in which considered option o may be applied, and total (cumulative) costs d for executing all options already assigned to robot 1 in question.
- estimated costs $d_0(\hat{s})$ for carrying out the option, starting from instantaneous robot state $\hat{s}$. In particular, the instantaneous state, such as the position of robot 1, may be taken into account for this purpose, so that the costs indicate the estimated effort by the robot for achieving a robot state that fulfills the state condition of the option.
- the expected value of the empirical costs, corresponding to the product of transition probability p(q'|q,o) for the considered option and empirical costs V(q') until target state q' is achieved.

The costs of the first term until the target state is achieved are then weighted by state probability $\hat{q}(q)$, with which the action of option o is actually executed in the future.

In addition, the weighted costs until the target system state is achieved are taken into account, using a second term that considers the costs of state q not being achieved and the action of option o not being selected. The second term represents the sum of all costs that are weighted with corresponding state probability $\hat{q}(\tilde{q})$ for terminating the mission via one of the alternative paths. This means that the costs via which instead of q, one of the other system states $\tilde{q} \neq q$ is achieved, are taken into account. For each system state $\tilde{q}$, these costs involve costs $D(\tilde{q})$ for achieving $\tilde{q}$, and empirical costs $V(\tilde{q})$ as expected costs until the target state is achieved.

State probability $\hat{q}(q)$ results from transition probabilities p(q'|q,o) to next system state q, i.e., the probability that an option o results in a system state q'.

Transition probability p(q'|q,o), which corresponds to the probability that an option o results in a successor state q', may be ascertained from the physical model of each robot 1, as follows. The transition probability is based on the probability that a set SA of physical target states s may be achieved by this robot 1. For this purpose, the following required variables are determined from transition probabilities p(t|s,a) of the physical robot model and planned actions π(a|s) of robot 1. The probability $$p_{MC}(t|s) = \sum_{a \in A} \pi(a|s)p(t|s,a)$$

indicates the probability of achieving, from one physical state s of the system, next physical state t. System states that are achievable by executing an option are referred to as absorption states. The other system states are referred to as transition states. Starting from $p_{MC}$, the matrix may be written in canonical form:

$$T_{MC} = \begin{bmatrix} Q & R \\ 0 & I \end{bmatrix},$$

where Q refers to the transition probabilities in the set of transition states, and R refers to the transition probabilities from a transition state to an absorption state. I corresponds to an identity matrix. Fundamental matrix N is then:

$$N = \sum_{k=0}^{\infty} Q^k = (I - Q)^{-1},$$

where N expresses that an element $N_{i,j}$ indicates the expected number of times that transition state $s_j$ is occupied, when starting from transition state $s_i$.

The costs of option o to be expected are a function of the expected number of steps before an absorption state is achieved, and may be ascertained using:

$$d_0 = (N\mathbf{1})^T \hat{s}^{[t]},$$

where $\hat{s}^{[t]}$ corresponds to a vector over transition states s, and $\hat{s}^{[t]} = \hat{s}(s)$. In particular, the costs correspond to 0, when starting from an absorption state.

The ultimate state distribution after terminating option o, i.e., the distribution over the absorption states, corresponds to:

$$\hat{s}_0 = (NR)^T \hat{s}^{[t]} + \hat{s}^{[a]},$$

where $\hat{s}^{[a]}$, the same as above, corresponds to a vector over absorption states s, and $\hat{s}^{[a]} = \hat{s}(s)$.

The transition probability then corresponds to:

$$p(q'|q, o) = \sum_{s \in SA} \hat{s}_0(s),$$

as the result of which the overall probability of achieving one of the target states in set SA of target states s is determined.

State probability $\hat{q}(q)$ results from transition probabilities p(q'|q,o) for the next system state. For the first auction round, $\hat{q}(q)=1$, i.e., corresponding to the state probability that a previously executed option o has resulted in system state q. For next auction round k+1, after selecting the option that the preceding auction round has "won," state probability $\hat{q}(q)$ is updated as a function of transition probabilities p(q'|q, o) for all possible options q', as follows:

$$\hat{q}_{k+1}(q') = \hat{q}_k(q') + p(q'|q,o)\hat{q}_k(q)$$

$\hat{q}_{k+1}(q')=0$ is set after this update, since a subsequent option ensures that the mission does not end at state q.

Empirical costs V essentially indicate the costs that are necessary to reach the target state, starting from a certain system state. V(q) thus indicates the costs of reaching the target state, starting from the instantaneous system state. V(q') indicates the costs of reaching the target state, starting from the successor state determined by option o. In particular, these costs may correspond to the expected time period until the target state is achieved. Empirical costs V are difficult to compute, and it is therefore recommended to ascertain them with the aid of a subsequent reinforcement learning process.

As described above, each robot 1 follows an option in parallel after the auction in question has ended, and the robot that has won the first auction round ultimately terminates the action of auction o. Upon termination of option o, the necessary action costs that were required by robot 1 in question for the action of the corresponding option are recorded. Reinforcement learning may be applied to the iterations, in which in each case a robot 1 selects a next option and executes same, resulting in observed action costs (execution duration) and a successor state q'.

In order to derive empirical costs V from these observations for an achieved system state $q_k$, the empirical costs of system state $q_k$ are updated after each ascertainment of action costs, as follows:

$$V_{k+1}(q_k) = V_k(q_k) + \alpha_k \delta_k$$

With a non-negative predefined step parameter $\alpha_k$ and TD error, $$\delta_k = d_k + V_k(q_{k+1}) - V_k(q_k)$$

Empirical costs $V_0(q)$ are initially set to 0 for all q. After each option o is executed, empirical costs V for achieved system state q are correspondingly updated as follows:

$$\delta_i = d_i + V_k(q'_i) - V_k(q_i)$$

$$V_{k+1}(q_i) = V_k(q_i) + \alpha_k \delta_i$$

The empirical costs may be explicitly updated between robots 1. Alternatively, they may also be implicitly updated in each of robots 1 by transmitting the costs required for executing terminated option o.

Costs D(q), i.e., the costs of achieving initial system state q in which considered option o may be applied, are ascertained for each auction round k as follows:

$$D^{(k+1)}(q') = \frac{p^{(k)}(q')}{\overline{p}^{(k)}(q') + \overline{p}^{(k)}(q)p(q'|q, o)} D^{(k)}(q') + \frac{\overline{p}^{(k)}(q)p(q'|q, o)}{\overline{p}^{(k)}(q') + \overline{p}^{(k)}(q)p(q'|q, o)} (D^{(k)}(q) + d_0),$$

where $\overline{p}^{(k)}$ corresponds to cumulative probabilities $$\overline{p}^{(k+1)}(q') = \overline{p}^{(k)}(q') + p(q'|q,o)\overline{p}^{(k)}(q).$$

FIGS. 5a through 5c illustrate for an example of an automaton the considerations of options for successive auction rounds, namely, a first, second, and third auction round.

In FIG. 5a the system state is in state q1, starting from which two successor states q2 and q3 are possible. These successor states are assessed in corresponding options o1, o2. All possible options o1, o2, i.e., possible transitions to a successor state q2 and q3, are now assessed in each robot 1 and the action costs are ascertained. In this example, it is now assumed that the ascertained action costs for o1 are the lowest, and that the system also selects this option in order to assign it to one of robots 1.

FIG. 5b shows an updated model of the system under this assumption as the basis for the second auction round, in order to likewise assign options to the other robots 1.

Transition probabilities $p(q_2|q_1,o_1)=0.8$ and $p(q_3|q_1,o_1)=0.2$ are associated with the transitions between q1 and q2 and q1 and q3, respectively, under the assumption that option o1 has been selected; the numerical values for this example are randomly selected, and otherwise may be ascertained from the physical robot model of executing robot 1. According to the procedure described above, state probabilities $\hat{q}(q_2)=0.8$ and $\hat{q}(q_3)=0.2$ result from these transition probabilities, and are now taken into account as a factor when computing the following action costs.

The action costs always take into account the estimated costs for the entire mission, i.e., the costs until the particular system state is achieved, i.e., $\max\{D(q),d^r\}$, the costs for the considered option, i.e., $d_0(\hat{s})$, and the costs for the remainder of the mission, starting from the successor state that is achievable via the considered option, i.e., $\Sigma_{q'} p(q'|q, o)V(q')$.

$$AK = \hat{q}(q)\left[\max\{D(q), d^r\} + d_0(\hat{s}) + \sum_{q'} p(q' \mid q, o)V(q')\right] + \sum_{\tilde{q}\neq q} \hat{q}(\tilde{q})(D(\tilde{q}) + V(\tilde{q}))$$

For the second auction round (cf. FIG. 5b), in addition to state probabilities $\hat{q}$, costs (duration) $D(q_2)$ are also taken into account in order to achieve system state q2 via assigned option o1, and for each of robots r, followed by costs $d^r$ of options already assigned to these robots 1.

In addition, the weighted total costs for all other system states that are achievable by the present system state, but in which the particular considered option is not usable, are ascertained, i.e., $\Sigma_{\tilde{q}\neq q}\hat{q}(\tilde{q})+V(\tilde{q}))$. The case is thus taken into account that the considered option is not executed, and instead one of the other options is executed. This takes place using the total mission costs that are weighted with the corresponding probabilities when carrying out the other options.

In this case, for example for computing the action costs of an option o3 from q2 to q3, this means that term $[\max\{D(q_2),d^r\}+d_0(\hat{s})+\Sigma_{q'}p(q'|q,o)V(q')]$ is taken into account with a weighting of state probability $\hat{q}(q_2)=0.8$, and in addition, term $(D(q_3)+V(q_3))$ is taken into account with a weighting of $\hat{q}(q_3)=0.2$, in order to consider the mission duration in the case that q2 is not achieved, and therefore option o3 is not activated.

For the third auction round in FIG. 5c, state probability $\hat{q}$ is then updated according to the same principle. For example, for assumed transition probabilities $p(q_3|q_2,o_3)=0.7$ and $p(q_4|q_2,o_3)=0.3$, in the third auction round the new state probability for $q_3$ results as $\hat{q}(q_3)=0.2+0.8\cdot 0.7=0.76$, first term 0.2 relating to the case that $q_3$ is achieved directly from $q_1$, as already taken into account in the second auction round, and second term $0.8\cdot 0.7$ covering the case that $q_3$ is achieved via $q_2$.

What is claimed is:

1. A method for operating a multi-agent system including multiple robots, in which a predefined mission that is defined by a sequence of a plurality of system states is to be executed, wherein the plurality of system states include an initial system state and a target system state that is attainable alternatively by use of any of a plurality of state sequences that are each formed of a respective one or more intermediate system states between the initial state and the target system state, each robot of the robots cyclically carrying out the following steps:

carrying out an auction process having one or multiple auction rounds, the following steps being carried out in each active one of the auction rounds:
starting from a considered one of the plurality of system states, ascertaining a plurality of possible options, the possible options each defining a respective action via which a transition from the considered system state to a respective successor state may be achieved, the respective successor state being either one of the intermediate system states immediately following the considered system state or the target system state immediately following the considered system state, wherein, for one or more of the auction rounds, different ones of the plurality of possible options are to different ones of the intermediate system states and different ones of the plurality of possible options are to a same one of the intermediate system states using different actions;
for each possible option of the plurality of possible options, ascertaining a total action cost for the respective robot to carry out the action that is defined by the possible option;
providing to the other robots the total ascertained action cost for each of the possible options, and receiving from the other robots total action costs for each of the possible options;
carrying out an auction by, for each of the plurality of possible options of the auction round, comparing all of the total action costs of the respective robot and of the other robots, wherein the respective robot assigns to itself the respective possible option when and conditional upon that a result of the comparison is that a lowest of all of the total action costs of the respective option is the total action cost ascertained for the respective robot to carry out the action defined by the respective possible option, wherein the action costs of the possible options of the presently active one of the rounds are ascertained taking into account estimated mission costs that are based on (a) where the presently active one of the rounds is not a first one of the rounds of the auction process, costs ascertained in one or more previously carried out rounds of the auction process for achieving the currently considered one of the system states, (b) empirical costs that indicate estimated costs for achieving the target state of the mission, starting from a successor state that is achievable via the considered option, (c) costs for carrying out the considered option, and (d) a transition probability that the mission utilizes the considered option; and
determining whether to carry out another of the one or multiple rounds in which the successor states are used as the considered system state or to instead terminate the auction process according to a condition that (I) the another of the one or multiple rounds is to be carried out without performance of the actions of the assigned options of the currently active one of the rounds if both (a) not all of the robots have been assigned one of the options of the auction process and (b) the target state has not been reached as any of the successor states and (II) the auction process is otherwise terminated; and responsive to the termination of the auction process, beginning an execution of those of the actions of the options that the respective robot has assigned to itself during the auction process.

2. The method as recited in claim 1, wherein the empirical costs are updated by one of the robots upon achieving a successor state when executing an action associated with one of the possible options, by ascertaining costs for executing the action by the one of the robots.

3. The method as recited in claim 1, wherein the action costs for each possible option are indicated as a function of a time period or as a time period for executing the action associated with the possible option.

4. The method as recited in claim 1, wherein the action costs for each possible option are ascertained as a function of a state probability that a state condition for achieving the successor state, when executing the action associated with the possible option, results from the possible option.

5. The method as recited in claim 1, wherein a state probability that a state condition for achieving the system state is achieved when executing an action that is associated with an option is updated.

6. A robot for operating in a multi-agent system that includes the robot and other robots, in which a predefined mission that is defined by a sequence of a plurality of system states is to be carried out, wherein the plurality of system states include an initial system state and a target system state that is attainable alternatively by use of any of a plurality of state sequences that are each formed of a respective one or more intermediate system states between the initial state and the target system state, the robot being configured to cyclically execute the following steps:

carrying out an auction process having one or multiple auction rounds, the following steps being carried out in each active one of the auction rounds:

starting from a considered one of the plurality of system states, ascertaining a plurality of possible options, the possible options each defining a respective action via which a transition from the considered system state to a respective successor state may be achieved, the respective successor state being either one of the intermediate system states immediately following the considered system state or the target system state immediately following the considered system state, wherein, for one or more of the auction rounds, different ones of the plurality of possible options are to different ones of the intermediate system states and different ones of the plurality of possible options are to a same one of the intermediate system states using different actions;

for each possible option of the plurality of possible options, ascertaining a total action cost for the robot to carry out the action that is defined by the possible option;

providing to the other robots the total ascertained action cost for each of the possible options, and receiving from the other robots total action costs for each of the possible options;

carrying out an auction by, for each of the plurality of possible options of the auction round, comparing all of the total action costs of the robot and of the other robots, wherein the robot assigns to itself the respective possible option when and conditional upon that a result of the comparison is that a lowest of all of the total action costs of the respective option is the total action cost ascertained for the robot to carry out the action defined by the respective possible option, wherein the action costs of the possible options of the presently active one of the rounds are ascertained taking into account estimated mission costs that are based on (a) where the presently active one of the rounds is not a first one of the rounds of the auction process, costs ascertained in one or more previously carried out rounds of the auction process for achieving the currently considered one of the system states, (b) empirical costs that indicate estimated costs for achieving the target state of the mission, starting from a successor state that is achievable via the considered option, (c) costs for carrying out the considered option, and (d) a transition probability that the mission utilizes the considered option; and determining whether to carry out another of the one or multiple rounds in which the successor states are used as the considered system state or to instead terminate the auction process according to a condition that (I) the another of the one or multiple rounds is to be carried out without performance of the actions of the assigned options of the currently active one of the rounds if both (a) not all of the robots have been assigned one of the options of the auction process and (b) the target state has not been reached as any of the successor states and (II) the auction process is otherwise terminated; and responsive to the termination of the auction process, beginning an execution of those of the actions of the options that the robot has assigned to itself during the auction process.

7. A multi-agent system including multiple robots, in which a predefined mission that is defined by a sequence of a plurality of system states is to be carried out, wherein the plurality of system states include an initial system state and a target system state that is attainable alternatively by use of any of a plurality of state sequences that are each formed of a respective one or more intermediate system states between the initial state and the target system state, each respective one of the robots being configured to cyclically execute the following steps:

carrying out an auction process having one or multiple auction rounds, the following steps being carried out in each active one of the auction rounds:

starting from a considered one of the plurality of system states, ascertaining a plurality of possible options, the possible options each defining a respective action via which a transition from the considered system state to a respective successor state may be achieved, the respective successor state being either one of the intermediate system states immediately following the considered system state or the target system state immediately following the considered system state, wherein, for one or more of the auction rounds, different ones of the plurality of possible options are to different ones of the intermediate system states and different ones of the plurality of possible options are to a same one of the intermediate system states using different actions;

for each possible option of the plurality of possible options, ascertaining a total action cost for the respective robot to carry out the action that is defined by the possible option;

providing to the other robots the total ascertained action cost for each of the possible options, and receiving from the other robots total action costs for each of the possible options; and carrying out an auction by, for each of the plurality of possible options of the auction round, comparing all of the total action costs of the respective robot and of the other robots, wherein the respective robot assigns to itself the respective possible option when and conditional upon that a result of the comparison is that a lowest of all of the total action costs of the respective option is the total action cost ascertained for the respective robot to carry out the action defined by the respective possible option, wherein the action costs of the possible options of the presently active one of the rounds are ascertained taking into account estimated mission costs that are based on (a) where the presently active one of the rounds is not a first one of the rounds of the auction process, costs ascertained in one or more previously carried out rounds of the auction process for achieving the currently considered one of the system states, (b) empirical costs that indicate estimated costs for achieving the target state of the mission, starting from a successor state that is achievable via the considered option, (c) costs for carrying out the considered option, and (d) a transition probability that the mission utilizes the considered option; and determining whether to carry out another of the one or multiple rounds in which the successor states are used as the considered system state or to instead terminate the auction process according to a condition that (I) the another of the one or multiple rounds is to be carried out without performance of the actions of the assigned options of the currently active one of the rounds if both (a) not all of the robots have been assigned one of the options of the auction process and (b) the target state has not been reached as any of the successor states and (II) the auction process is otherwise terminated; and responsive to the termination of the auction process, beginning an execution of those of the actions of the options that the respective robot has assigned to itself during the auction process.

8. A non-transitory machine-readable memory medium on which is stored a computer program stored for operating a robot in a multi-agent system including the robot and other robots, in which a predefined mission that is defined by a sequence of a plurality of system states is to be executed, wherein the plurality of system states include an initial system state and a target system state that is attainable alternatively by use of any of a plurality of state sequences that are each formed of a respective one or more intermediate system states between the initial state and the target system state, the computer program, when executed by a processor of the robot, causing the processor to cyclically carry out the following steps:

carrying out an auction process having one or multiple auction rounds, the following steps being carried out in each active one of the auction rounds:

starting from a considered one of the plurality of system states, ascertaining a plurality of possible options, the possible options each defining a respective action via which a transition from the considered system state to a respective successor state may be achieved, the respective successor state being either one of the intermediate system states immediately following the considered system state or the target system state immediately following the considered system state, wherein, for one or more of the auction rounds, different ones of the plurality of possible options are to different ones of the intermediate system states and different ones of the plurality of possible options are to a same one of the intermediate system states using different actions;

for each possible option of the plurality of possible options, ascertaining a total action cost for the respective robot to carry out the action that is defined by the possible option;

providing to the other robots the total ascertained action cost for each of the possible options, and receiving from the other robots total action costs for each of the possible options; and carrying out an auction by, for each of the plurality of possible options of the auction round, comparing all of the total action costs of the respective robot and of the other robots, wherein the respective robot assigns to itself the respective possible option when and conditional upon that a result of the comparison is that a lowest of all of the total action costs of the respective option is the total action cost ascertained for the respective robot to carry out the action defined by the respective possible option, wherein the action costs of the possible options of the presently active one of the rounds are ascertained taking into account estimated mission costs that are based on (a) where the presently active one of the rounds is not a first one of the rounds of the auction process, costs ascertained in one or more previously carried out rounds of the auction process for achieving the currently considered one of the system states, (b) empirical costs that indicate estimated costs for achieving the target state of the mission, starting from a successor state that is achievable via the considered option, (c) costs for carrying out the considered option, and (d) a transition probability that the mission utilizes the considered option; and determining whether to carry out another of the one or multiple rounds in which the successor states are used as the considered system state or to instead terminate the auction process according to a condition that (I) the another of the one or multiple rounds is to be carried out without performance of the actions of the assigned options of the currently active one of the rounds if both (a) not all of the robots have been assigned one of the options of the auction process and (b) the target state has not been reached as any of the successor states and (II) the auction process is otherwise terminated; and responsive to the termination of the auction process, beginning an execution of those of the actions of the options that the respective robot has assigned to itself during the auction process.

* * * * *